July 7, 1964  R. P. DAUBENSPECK  3,139,721
CANOPY ACTUATOR AND EJECTOR DEVICE
Filed March 16, 1962  3 Sheets-Sheet 3

INVENTOR.
R. P. DAUBENSPECK
BY
ATTORNEYS

United States Patent Office 3,139,721
Patented July 7, 1964

3,139,721
CANOPY ACTUATOR AND EJECTOR DEVICE
Richard P. Daubenspeck, Pacific Palisades, Calif., assignor to the United States of America as represented by the Secretary of the Air Force
Filed Mar. 16, 1962, Ser. No. 180,369
12 Claims. (Cl. 60—6)

This invention relates to actuating devices used to lift or counterbalance structures and, under certain emergency conditions, to separate the structure being actuated from the structure to which it is joined.

While not limited to such use, this invention is especially useful in connection with the movement of the canopy on an airplane.

Most present day airplanes having movable canopies are designed to be operational at supersonic speed and at extremely high altitude. The canopy on such an airplane must be structurally capable of withstanding not only the cabin pressurization, but also the tremendous pressure externally applied when the airplane is in flight. Through necessity, the canopy of such an airplane has become large, heavy and extremely difficult to manipulate without power assists. Airplane canopies may be of the hinged type which are opened and closed by angular movement about the axis of the hinges, or of the sliding type which may be opened and closed by sliding the canopy structure in suitable channels joined to the fuselage. While the present invention is suitable for use on either the hinged or the sliding type of canopy, for purposes of illustration, the use of the invention will be shown and described in connection with a high velocity airplane having a canopy hinged at the rear so as to be openable and closable from the front.

The most critical aspect of canopy actuation occurs during flight when it becomes necessary to jettison the canopy in order that the pilot may bail out of the airplane. An ejection device must be provided which not only is capable of opening the canopy against the dynamic forces holding the canopy in place, but one which will also eject the canopy a great enough distance to assure that it will not strike some portion of the airplane and bounce into the path of the pilot who has bailed out. The ejector device should store enough energy, which can be released in a minimum period of time, to blow the canopy from its hinges rather than to merely open the canopy sufficiently to permit the air flow to act on the underside and rip the canopy from the fuselage.

In addition to the ejector device for blowing the canopy from the fuselage during a flight emergency, it is desirable to have a power actuator to manipulate the heavy canopy when the airplane is on the ground. It is also desirable to have a counterbalancing device which will permit manual manipulation of the canopy with reduced effort when there is a power failure making the power actuating device inoperative.

As will be shown hereafter, the present invention combines the power actuator for manipulating the canopy, the counterbalancing device, and the ejector device into a simple integral unit.

One of the objects of the present invention is to provide an actuator device of improved construction for the manipulation of the canopy on a grounded airplane.

Another object of the present invention is to provide a counterbalancing device having a self-contained charge of high pressure gas for counterbalancing the canopy of a grounded airplane.

A further object of the present invention is to provide an ejector having a self-contained charge of high pressure gas for jettisoning the canopy from an airplane in flight.

Yet another object of the present invention is to combine the actuator device, the counterbalancing device and the ejector into a single integrated unit.

Still another object of the present invention is to provide a canopy actuating and ejecting unit which is lightweight, of simple construction, and which will perform its various functions with a minimum of elements.

Additional objects, advantages and features of the invention reside in the construction, arrangement and combination of parts involved in the embodiment of the invention as will appear from the following description and accompanying drawings wherein:

FIG. 6 is a transverse cross section taken on line 6—6 of FIG. 2.

Figure 1:
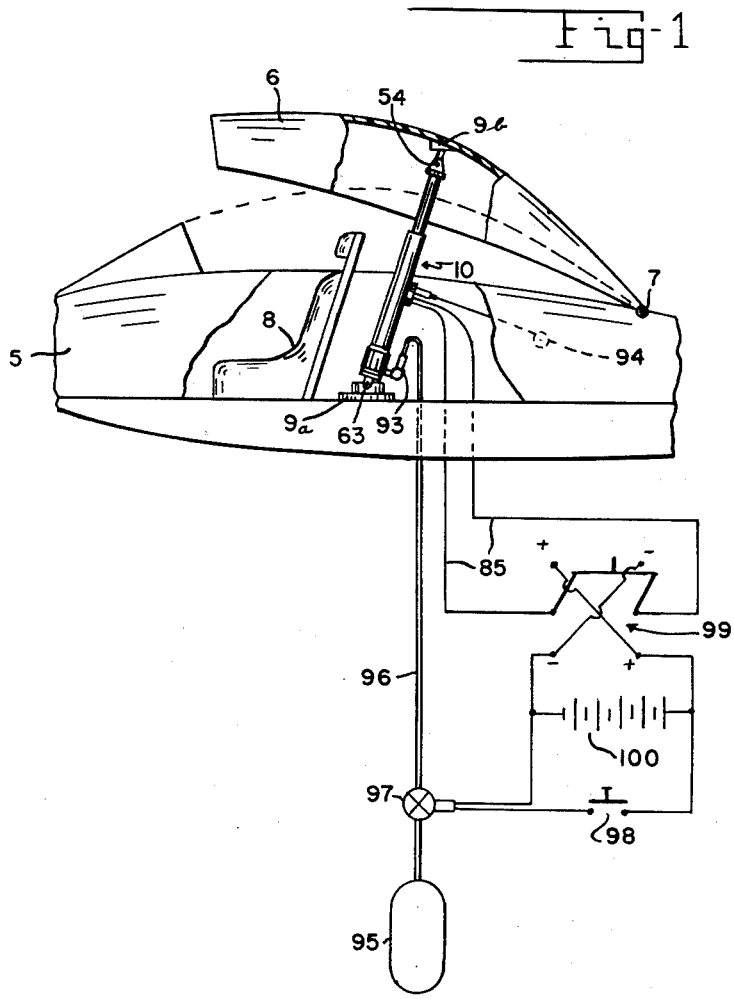
FIG. 1 is a schematic drawing of a portion of an airplane fuselage showing a hinged canopy actuated by a device as contemplated by the present invention operably installed behind the pilot's seat, and showing in schematic form the controls necessary to operate the device.

Referring now to the drawings, and in particular to FIG. 1, the canopy actuator-ejector unit referred to generally as unit 10 is shown installed in the fuselage 5 of an airplane having a hinged canopy 6 joined at the rear portion thereof to the fuselage by means of hinges 7. Unit 10 is installed behind the pilot's seat 8 by being pivotally joined at the lower end to bracket 9a which is attached to the fuselage structure, and at the upper end by being pivotally joined to bracket 9b which is attached to the canopy.

Figure 2:
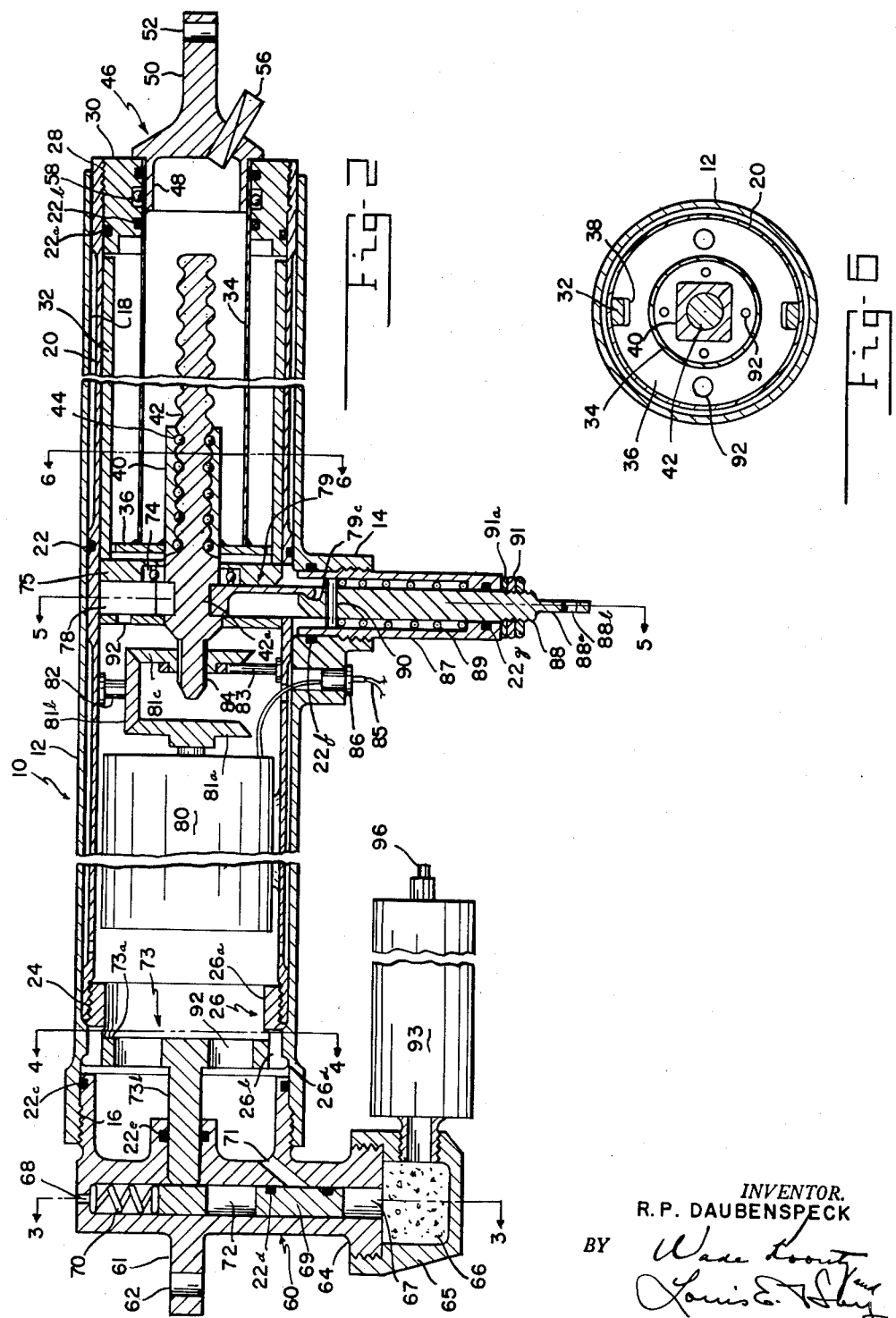
FIG. 2 is a longitudinal cross section of the device showing the relationship of elements when the device is in its normally retracted position.

Referring in particular to FIG. 2, unit 10 comprises a housing member 12, having a radial boss 14 near its midsection. One end of housing member 12 has an internal thread 16 and the other end of the housing member is bored to form a cylinder 18. Axially slidable within cylinder 18 is ejector tube 20 having a seal ring 22. One end of ejector tube 20 has internal threads 24 to engage retainer ring 26 and the other end of ejector tube 20 has internal threads 28 to engage guide ring 30. A plurality of longitudinal guide rails 32, having a cross section as shown on FIG. 6 are welded or otherwise joined to the inside diameter of ejector tube 20 as shown on FIG. 2.

Axially slidable within guide ring 30 is actuator tube 34, to the inner end of which is joined guide disk 36. Guide disk 36 is of proper diameter to be axially slidable within ejector tube 20 and has a plurality of notches 38 which engage guide rails 32 as shown on FIG. 6. On the axial center of guide disk 36 is a hole suitable for receiving nut 40 which is joined or welded to disk 36 as shown. Nut 40 is actuated by jack screw 42. Nut 40 and jack screw 42 may be of the type manufactured by the Saginaw Steering Gear Division of General Motors and contain a plurality of balls 44 in the screw threads as antifriction devices. The outer end of actuator tube 34 is sealed with end plug 46 which has a shouldered hub 48, the outside diameter of which slips into actuator tube 34 where it is welded in place. End plug 46 terminates in lug 50 which has a hole 52 for receiving pin 54 when end plug 46 is joined to bracket 9b as shown on FIG. 1. End plug 46 receives a charging valve 56 of any convenient commercially available type for a purpose to be hereinafter described. Guide ring 30 carries a plurality of seal rings such as seal rings 22a and 22b used to prevent the escape of the gas charged into the unit as will be hereinafter described. Guide ring 30 also carries an antifriction bearing 58 of any suitable commercially available type and used to reduce the sliding friction between actuator tube 34 and guide ring 30. While the operation of the device will be more fully described hereafter, it will suffice for the present to state that as jack screw 42 is rotated in the proper direction, either clockwise or counterclockwise depending on thread direction, the actuator tube 34 will be extended from unit 10, and when the jack screw is rotated in the opposite direction, the actuator tube will be retracted into the unit.

Figure 4:
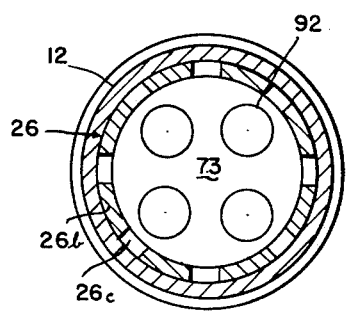
FIG. 4 is a transverse cross section taken on line 4—4 of FIG. 2.

Again referring to FIG. 2, retainer ring 26 has a threaded ring portion 26a and a plurality of fingers 26b axially projecting from one face of the threaded ring portion in spaced circumferential relationship. The fingers 26b may be formed by milling a series of slots 26c as best shown on FIG. 4 to the desired depth of the fingers as shown on FIG. 2. The ends of the fingers terminate in circumferential cam surfaces 26d which engage a like cam surface on the transverse ring integral with housing member 12, thereby retaining ejector tube 20 within the housing member.

Figure 3:
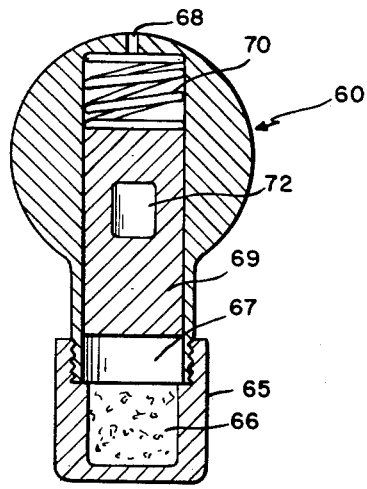
FIG. 3 is a transverse cross section taken on line 3—3 of FIG. 2.

Base member 60 has a threaded hub which engages threads 16 of housing member 12. The escape of gas from within unit 10 through threads 16 is prevented by seal ring 22c. Base member 60 has an integral lug 61 having hole 62 for receiving pin 63 when base member 60 is joined to bracket 9a as shown on FIG. 1. Base member 60 has a threaded hub 64 adapted to threadably engage cup 65 containing explosive charge 66. Within base member 60 and positioned to be normal to the longitudinal axis of unit 10, is bore 67 shown on FIG. 2 and FIG. 3. The closed end of bore 67 contains a small vent hole 68 to prevent compression of entrapped air from movement of latch plug 69 which is slidable within bore 67. A compression spring 70 of any convenient shape is placed between the bottom of bore 67 and the end of plug 69. The compression spring is biased to hold the plug downward in the position shown on FIG. 2 and FIG. 3. The lower, or normal position of latch plug 69 may be established by means of a stop pin or other means well known to the art and not shown on the drawing. Communicating between bore 67 and the interior of base member 60 is an angular passage 71 as shown. The purpose of passage 71 will be described hereinafter. Retained within plug 69, so as to surround passage 71 and prevent escape of the compressed gas within unit 10, is seal ring 22d. Plug 69 contains an opening 72 as shown. The purpose of the opening will be described hereinafter.

The fingers 26b on retainer ring 26 are retained in the position shown on FIG. 2 by means of retainer plug 73. Retainer plug 73 consists of a flange 73a having an external diameter slidably engaging the internal diameter of fingers 26b and a stem 73b slidably engaging base member 60 and having the end of the stem resting against latch plug 69 in the general area above opening 72 in the latch plug. The purpose and operation of retainer plug 73 will be described hereinafter. The escape of the compressed gas from within unit 10 is prevented by seal ring 22e.

Figure 5:
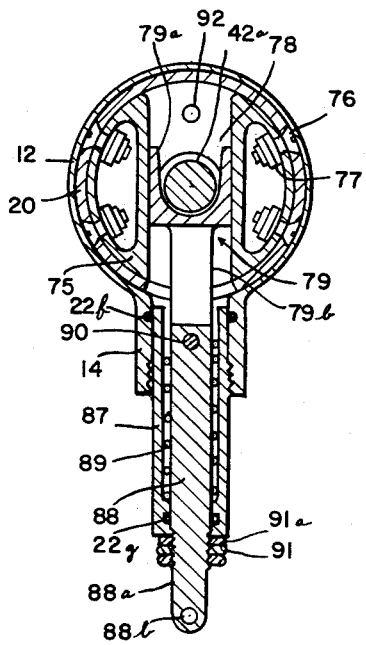
FIG. 5 is a transverse cross section taken on line 5—5 of FIG. 2.

Referring to FIG. 2, the driven end of jack screw 42 is journaled in bearing 74 supported by bracket 75 as best shown on FIG. 5. Bracket 75 is longitudinally installed within ejector tube 20 by means of a plurality of flat head screws 76 and self-locking nuts 77 as shown on FIG. 5. Bracket 75 which is of proper outside diameter to be slidable within ejector tube 20, contains a passage 78 for slidably receiving yoke 79. Yoke 79 has a forked head 79a and a tail 79b terminating in male cam 79c as best shown on FIG. 2. The jack screw 42 is driven by reversible motor 80, which is mounted within ejector tube 20 in any convenient manner, driving through a gear train comprising drive gear 81a, idler gear 81b and driven gear 81c. Idler gear 81b is rotatably supported by bracket 82 which is joined to ejector tube 20. Driven gear 81c is supportably journaled within a suitable bracket 83 which is likewise joined to ejector tube 20. The driven end of jack screw 42 terminates in a straight spline 84 which engages a mating female spline in driven gear 81c. Electrical leads 85 which energize the motor pass through a leak proof plug 86 joined to boss 14 on housing member 12.

Referring to FIG. 2 and FIG. 5, sleeve 87 is in threaded engagement with boss 14 as shown. The sleeve is bored to slidably receive pull rod 88 and is further counterbored to house compression spring 89. One end of the spring 89 bears against the bottom of the counterbore in sleeve 87 and the opposite end of the spring bears against pin 90 passing through pull rod 88. Leakage of the compressed gas within unit 10 is prevented by seal rings 22f and 22g. The internal end of pull rod 88 terminates in a female cam surface cooperating with the male cam 79c as best shown on FIG. 2. The external end of pull rod 88 terminates in a lug 88a having a hole 88b as best shown on FIG. 5. The normal position of pull rod 88 is adjusted by means of nuts 91. The pull rod should be adjusted to prevent the forked head 79a of yoke 79 from riding against the reduced diameter 42a of jack screw 42. If desired, a flat washer 91a may be placed between nuts 91 and the end of sleeve 87.

In order that the various areas or sections within unit 10 will be at a static pressure balance when the unit is charged with high pressure gas, passages must be provided for the flow of gas through the entire internal structure. Such flow passages are well known to the art. Typical flow passages, where appearing, are indicated as flow passages 92 without regard to quantity, size or shape. For example, the gas will flow from within actuator tube 34 through the small flow passages 92 through guide disc 36, as shown on FIG. 6; from where the gas will flow through the large flow passages 92 shown on FIG. 6 to pressurize the upper portion of the unit, and through the flow passages 92 in bracket 75, as shown on FIG. 2 and FIG. 5, to pressurize the cavity housing the motor 80. The interior of base member 60 is pressurized by gas flowing through flow passages 92 in the retainer plug 73 as shown on FIG. 2 and FIG. 4.

The explosive charge 66 is exploded by ballistic initiator 93 as best shown on FIG. 2. The ballistic initiator which is commercially available is of the type containing a small powder charge and a spring loaded firing pin held in cocked position by means of a shear pin which is sheared by the introduction of high pressure air or other gas.

The necessary controls for the operation of the device are shown schematically on FIG. 1. A bottle or flask 95 containing a charge of high pressure air or other gas is connected to the ballistic initiator by means of tubing 96 containing a normally closed solenoid operated valve 97. The solenoid valve is actuated by means of switch 98 which allows current to flow from power source 100 through the electrical element within the valve. When the solenoid valve is opened, high pressure gas flows from flask 95 to the ballistic initiator 93 where the pressure surge shears the shear pin thereby releasing the firing pin which sets off the explosive charge.

The reversible motor 80 in unit 10 is controlled by means of normally open reversing switch 99 which directs the flow of current from power source 100 through electrical leads 85 to motor 80.

Pull rod 88 is operated by means of a pull chain 94. If desired, the pull rod could easily be actuated by means of solenoid and control switch powered by power source 100.

In operation, unit 10 is charged through charging valve 56 with any convenient gas, such as nitrogen or air, to a pressure compatible with the counterbalancing force desired on the canopy. When the canopy is in the closed position, the elements comprising unit 10 are in the spaced relationship shown on FIG. 2.

The canopy may be actuated in the opening direction by energizing motor 80 in the proper direction with switch 99. The motor drives the jack screw 42 through the gear train shown. The jack screw imparts axial movement to nut 40 which in turn telescopes or extends actuator tube 34 from within the unit to thereby open the canopy. The actuator tube is limited to axial movement by guide disk 36 which is welded to actuator tube 34 and engages the axial guide rails 32. By means of switch 99, the canopy may be opened to any position between the normally closed and open positions. The canopy may be closed by reversing switch 99 which causes motor 80 to rotate in the opposite direction and retract the actuator tube within unit 10.

The compressed gas within unit 10 may be used as a counterbalancing force on the canopy in case of a power failure. Yoke 79 is withdrawn from engagement with jack screw 42 by means of pull chain 94. The compressed gas within unit 10, acting on the effective outside cross-sectional area of the actuator tube 34 which constitutes a movable area having a pressure differential, provides a force for counterbalancing the canopy. As the canopy is opened by hand, the straight spline 84 withdraws from gear 81c. The canopy may be opened by hand until the outer face of disk 36 strikes the inner end of guide ring 30. Provision may be made for holding yoke 79 in the withdrawn position until such time when the canopy is returned to the closed position. Since the motor 80 is not operated when the counterbalance is in operation, the relative position between gear 81c and spline 84 on jack screw 42 does not change, the spline will easily re-enter the gear as the canopy is closed.

When it is desired to jettison the canopy during a flight emergency, the pilot closes switch 98. Closing switch 98 permits current from power source 100 to flow through the electrical element of solenoid operated valve 97 which opens to permit high pressure gas to flow from bottle 95 through tube 96 into the ballistic initiator 93. The initiator fires explosive charge 66. The high pressure gaseous products of combustion expand to push latch plug 69 upward against compression spring 70 thereby putting opening 72 in line with the end of stem 73b of retainer plug 73. The compressed gas with which unit 10 is charged, is at the same static pressure on both sides of flange 73a of retainer plug 73. Since the effective cross-sectional area of plug 73 is greater on the forward side than on the stem side by an amount equal to the cross-sectional area of stem 73b, the plug will be forced out of retainer ring 26; stem 73b entering opening 72 of plug 69. The gas pressure within unit 10, assisted by the high pressure products of combustion from explosive charge 66, applies sufficient internal pressure to force ejector tube 20 from housing member 12. The applied gas pressure, acting over the effective cross-sectional area of the ejector tube 20, is sufficient to permit the cam surface on housing member 12, acting on cam surface 26d of fingers 26b, to bend the fingers inward and thereby release the ejector tube. The force is sufficient to blow the ejector tube 20 and all elements within the tube from the housing member. The tail 79b of yoke 79 is sufficiently thin that it may be readily torn or wrenched from pull rod 88 if necessary. However, as shown on FIG. 2, the design is such as will disengage cam 79c as the ejector tube commences to move forward.

Suitable canopy latches, limit switches and interlocks which are well known to the art and do not constitute elements of the present invention may be provided. Likewise, duplicate controls may be provided on the outer surface of the fuselage to permit canopy operation from the outside. The initiator may be of a type other than the one shown and described. Likewise, more than one power source, or alternate power sources may be used.

It is understood that the embodiment of the present invention as shown and described is to be regarded as illustrative only and that the invention is susceptible to variations, modifications and changes within the scope of the appended claims.

I claim:

1. A device, charged with high pressure air or other gaseous medium, for counterbalancing and moving a first element in relation to a second element, said device comprising a housing member having a cylinder, a base member joined to said housing member and adapted for joining to said second element, an ejector tube forming a piston within the cylinder of said housing member, holding means for releasably holding said ejector tube within said housing member, an actuator tube forming a piston within and coaxial with said ejector tube, an end plug joined to said actuator tube and adapted for joining to said first element, drive means within said housing member for axially extending and retracting said actuator tube to actuate said first element in relation to said second element, means for disengaging said actuator tube from said drive means to permit said device to exert a counterbalancing force on said first element, said counterbalancing force being produced by the gaseous charge within said device acting against said actuator tube and tending to move said actuator tube from said ejector tube, a latch plug slidable within said base member for releasably retaining said holding means, and a ballistic initiator, said ballistic initiator upon detonation moving said latch plug permitting said holding means to release said ejector tube and said actuator tube from said housing member for ejection from said housing member by the energy of said gaseous charge and high pressure products of combustion from said ballistic initiator acting against said ejector tube and said actuator tube.

2. A device, charged with high pressure air or other gaseous medium, for counterbalancing and moving a first element in relation to a second element, said device comprising a housing member having a cylinder, a base member joined to one end of said housing member and adapted for joining to said second element, an ejector tube forming a piston within the cylinder of said housing member, said ejector tube having means on one end for releasable retention within said housing member, holding means for releasably holding said ejector tube to said housing member, an actuator tube forming a piston within and coaxial with said ejector tube, an end plug joined to said actuator tube and adapted for joining to said first element, drive means within said ejector tube for axially extending and retracting said actuator tube to actuate said first element in relation to said second element, means for disengaging said actuator tube from said drive means to permit said device to exert a counterbalancing force on said first element, said counterbalancing force being produced by the gaseous charge within said device acting against said actuator tube and tending to move said actuator tube from said ejector tube, a latch plug slidable within said base member for releasably retaining said holding means, and a ballistic initiator, said ballistic initiator upon detonation moving said latch plug permitting said holding means to move from its holding position to release said ejector tube and said actuator tube from said housing member for ejection from said housing member by the energy of said gaseous charge and high pressure products of combustion from said ballistic initiator acting against said ejector tube and said actuator tube.

3. A device, charged with high pressure air or other gaseous medium, for counterbalancing and moving a first element in relation to a second element, said device comprising a housing member having a cylinder, a base member joined to said housing member and adapted for joining to said second element, an ejector tube forming a piston within the cylinder of said housing member, holding means for releasably holding said ejector tube within said housing member, an actuator tube forming a piston within and coaxial with said ejector tube, an end plug joined to said actuator tube and adapted for joining to said first element, drive means within said housing member for axially extending and retracting said actuator tube to actuate said first element in relation to said second element, said drive means comprising a nut joined to said actuator tube, a jack screw engaging said nut and means for rotating said jack screw in a clockwise and counterclockwise direction, means for disengaging said jack screw from said means for rotating said jack screw to permit said device to exert a counterbalancing force on said first element, said counterbalancing force being produced by the gaseous charge within said device acting against said actuator tube and tending to move said actuator tube from said ejector tube, a latch plug slidable within said base member for releasably retaining said holding means, and a ballistic initiator, said ballistic initiator upon detonation moving said latch plug permitting said holding means to release said ejector tube and said actuator tube from said housing member for ejection from said housing member by the energy of said gaseous charge and high pressure products of combustion from said ballistic initiator acting against said ejector tube and said actuator tube.

4. A device, charged with high pressure air or other gaseous medium, for counterbalancing and moving a first element in relation to a second element, said device comprising a housing member having a cylinder, a base member joined to one end of said housing member and adapted for joining to said second element, an ejector tube forming a piston within the cylinder of said housing member, said ejector tube having means on one end for releasable retention within said housing member, holding means for releasably holding said ejector tube to said housing member, an actuator tube forming a piston within and coaxial with said ejector tube, an end plug joined to said actuator tube and adapted for joining to said first element, drive means within said ejector tube for axially extending and retracting said actuator tube to actuate said first element in relation to said second element, said drive means comprising a nut joined to said actuator tube, a jack screw engaging said nut, and means for rotating said jack screw in a clockwise and counterclockwise direction, means for disengaging said jack screw from said drive means to permit said device to exert a counterbalancing force on said first element, said counterbalancing force being produced by the gaseous charge within said device acting against said actuator tube and tending to move said actuator tube from said ejector tube, a latch plug slidable within said base member for releasably retaining said holding means, and a ballistic initiator, said ballistic initiator upon detonation moving said latch plug permitting said holding means to move from its holding position to release said ejector tube and said actuator tube from said housing member for ejection from said housing member by the energy of said gaseous charge and high pressure products of combustion from said ballistic initiator acting against said ejector tube and said actuator tube.

5. A device, charged with high pressure air or other gaseous medium, for counterbalancing and moving a first element in relation to a second element, said device comprising a housing member, a cylinder within said housing member, a transverse ring integral with said housing member and extending into said cylinder, said ring having a cam surface, a base member joined to said housing member and adapted for joining to said second element, an ejector tube forming a piston within the cylinder of said housing member, said ejector tube having means at one end for releasable retention within said housing member by engagement with the cam surface on said transverse ring, holding means for releasably forcing said ejector tube against the cam surface on said transverse ring, an actuator tube forming a piston within and coaxial with said ejector tube, an end plug joined to said actuator tube and adapted for joining to said first element, drive means within said housing member for axially extending and retracting said actuator tube to actuate said first element in relation to said second element, means for disengaging said actuator tube from said drive means to permit said device to exert a counterbalancing force on said first element, said counterbalancing force being produced by the gaseous charge within said device acting against said actuator tube and tending to move said actuator tube from said ejector tube, a latch plug slidable within said base member for releasably retaining said holding means, and a ballistic initiator, said ballistic initiator upon detonation moving said latch plug permitting said holding means to release said ejector tube and said actuator tube from said housing member for ejection from said housing member by the energy of said gaseous charge and high pressure products of combustion from said ballistic initiator acting against said ejector tube and said actuator tube.

6. A device, charged with high pressure air or other gaseous medium, for counterbalancing and moving a first element in relation to a second element, said device comprising a housing member, a cylinder within said housing member, a transverse ring integral with said housing member and extending into said cylinder, said ring having a cam surface, a base member joined to said housing member and adapted for joining to said second element, an ejector tube forming a piston within said cylinder, said ejector tube having means at one end for releasable retention within said housing member by engagement with the cam surface on said transverse ring, holding means for releasably forcing said ejector tube against the cam surface on said transverse ring, an actuator tube forming a piston within and coaxial with said ejector tube, an end plug joined to said actuator tube and adapted for joining to said first element, drive means within said ejector tube for axially extending and retracting said actuator tube to actuate said first element in relation to said second element, said drive means comprising a nut joined to said actuator tube, a jack screw engaging said nut, and means for rotating said jack screw in a clockwise and counterclockwise direction, means for disengaging said jack screw from said drive means to permit said device to exert a counterbalancing force on said first element, said counterbalancing force being produced by the gaseous charge within said device acting against said actuator tube and tending to move said actuator tube from said ejector tube, a latch plug slidable within said base member for releasably retaining said holding means, and a ballistic initiator, said ballistic initiator upon detonation moving said latch plug permitting said holding means to move from its holding position to release said ejector tube and said actuator tube from said housing member for ejection from said housing member by the energy of said gaseous charge and high pressure products of combustion from said ballistic initiator acting against said ejector tube and said actuator tube.

7. A device, charged with high pressure air or other gaseous medium, for counterbalancing and moving a first element in relation to a second element, said device comprising a housing member having a cylinder, a base member joined to said housing member and adapted for joining to said second element, an ejector tube forming a piston within the cylinder of said housing member, holding means for releasably holding said ejector tube within said housing member, an actuator tube forming a piston within and coaxial with said ejector tube, an end plug joined to said actuator tube and adapted for joining to said first element, drive means within said housing member for axially extending and retracting said actuator tube to actuate said first element in relation to said second element, guide means joined within said ejector tube for axially guiding said actuator tube, means for disengaging said actuator tube from said drive means to permit said device to exert a counterbalancing force on said first element, said counterbalancing force being produced by the gaseous charge within said device acting against said actuator tube and tending to move said actuator tube from said ejector tube, a latch plug slidable within said base member for retaining and releasing said holding means, a compression spring biasing said latch plug in the retaining position, and a ballistic initiator, said ballistic initiator upon detonation moving said latch plug to the position releasing said holding means to release said ejector tube and said actuator tube from said housing member for ejection from said housing member by the energy of said gaseous charge and high pressure products of combustion from said ballistic initiator acting against said ejector tube and said actuator tube.

8. A device, charged with high pressure air or other gaseous medium, for counterbalancing and moving a first element in relation to a second element, said device comprising a housing member having a cylinder, a base member joined to one end of said housing member and adapted for joining to said second element, an ejector tube forming a piston within the cylinder of said housing member, said ejector tube having means on one end for releasable retention within said housing member, holding means for releasably holding said ejector tube to said housing member, an actuator tube forming a piston within and coaxial with said ejector tube, an end plug joined to said actuator tube and adapted for joining to said first element, drive means within said ejector tube for axially extending and retracting said actuator tube to actuate said first element in relation to said second element, said drive means comprising a nut joined to said actuator tube, a jack screw engaging said nut, and means for rotating said jack screw in a clockwise and counterclockwise direction, guide means joined within said ejector tube for axially guiding said actuator tube, means for disengaging said jack screw from said drive means to permit said device to exert a counterbalancing force on said first element, said counterbalancing force being produced by the gaseous charge within said device acting against said actuator tube and tending to move said actuator tube from said ejector tube, a latch plug slidable within said base member for retaining and releasing said holding means, a compression spring biasing said latch plug in the retaining position, and a ballistic initiator, said ballistic initiator upon detonation moving said latch plug to the position releasing said holding means to release said ejector tube and said actuator tube from said housing member for ejection from said housing member by the energy of said gaseous charge and high pressure products of combustion from said ballistic initiator acting against said ejector tube and said actuator tube.

9. A device, charged with high pressure air or other gaseous medium, for counterbalancing and moving a first element in relation to a second element, said device comprising a housing member, a cylinder within said housing member, a transverse ring integral with said housing member and extending into said cylinder, said ring having a cam surface, a base member joined to said housing member and adapted for joining to said second element, an ejector tube forming a piston within said cylinder, said ejector tube having means at one end for releasable retention within said housing member by engagement with the cam surface on said transverse ring, holding means for releasably forcing said ejector tube against the cam surface on said transverse ring, an actuator tube forming a piston within and coaxial with said ejector tube, an end plug joined to said actuator tube and adapted for joining to said first element, drive means within said ejector tube for axially extending and retracting said actuator tube to actuate said first element in relation to said second element, said drive means comprising a nut joined to said actuator tube, a jack screw engaging said nut, and means for rotating said jack screw in a clockwise and counterclockwise direction, guide means joined within said ejector tube for axially guiding said actuator tube, means for disengaging said jack screw from said drive means to permit said device to exert a counterbalancing force on said first element, said counterbalancing force being produced by the gaseous charge within said device acting against said actuator tube and tending to move said actuator tube from said ejector tube, a latch plug slidable within said base member for retaining and releasing said holding means, a compression spring biasing said latch plug in the retaining position, and a ballistic initiator, said ballistic initiator upon detonation moving said latch plug to the position releasing said holding means to release said ejector tube and said actuator tube from said housing member for ejection from said housing member by the energy of said gaseous charge and high pressure products of combustion from said ballistic initiator acting against said ejector tube and said actuator tube.

10. A device, charged with high pressure air or other gaseous medium, for counterbalancing and moving a first element in relation to a second element, said device comprising a housing member, a cylinder within said housing member, a transverse ring integral with said housing member and extending into said cylinder, said ring having a cam surface transverse to the axis of said cylinder, a base member joined to said housing member and adapted for joining to said second element, an ejector tube forming a piston within said cylinder, a retainer ring, said retaining ring being joined to said ejector tube and having a plurality of axially extending fingers for releasable engagement with the cam surface on said transverse ring, holding means for releasably forcing the fingers of said retaining ring against the cam surface on said transverse ring, an actuator tube forming a piston within and coaxial with said ejector tube, an end plug joined to the outer end of said actuator tube and adapted for joining to said first element, a guide disk, said guide disk being axially slidable within said ejector tube and joined to the inner end of said actuator tube, drive means within said ejector tube for axially extending and retracting said actuator tube to actuate said first element in relation to said second element, said drive means comprising a nut joined to said guide disk, a jack screw engaging said nut, and means for rotating said jack screw in a clockwise and counterclockwise direction, guide means joined within said ejector tube for axially guiding said actuator tube by engaging said guide disk, said guide disk having slots for engaging said guide means, means for disengaging said jack screw from said drive means to permit said device to exert a counterbalancing force on said first element, said counterbalancing force being produced by the gaseous charge within said device acting against said actuator tube and tending to move said actuator tube from said ejector tube, a latch plug slidable within said base member for retaining and releasing said holding means, a compression spring biasing said latch plug in the retaining position, and a ballistic initiator, said ballistic initiator upon detonation moving said latch plug to the position releasing said holding means to release said ejector tube and said actuator tube from said housing member for ejection from said housing member by the energy of said gaseous charge and high pressure products of combustion from said ballistic initiator acting against said ejector tube and said actuator tube.

11. A device, charged with high pressure air or other gaseous medium, for counterbalancing and moving a first element in relation to a second element, said device comprising a housing member, a cylinder within said housing member, a transverse ring integral with said housing member and extending into said cylinder, said ring having a cam surface, a base member joined to said housing member and adapted for joining to said second element, an ejector tube forming a piston within said cylinder, said ejector tube having means at one end for releasable engagement with the cam surface on said transverse ring, holding means for releasably forcing said ejector tube against the cam surface on said transverse ring, an actuator tube forming a piston within and coxial with said ejector tube, an end plug joined to said actuator tube and adapted for joining to said first element, drive means within said ejector tube for axially extending and retracting said actuator tube to actuate said first element in relation to said second element, said drive means comprising a nut joined to said actuator tube, a jack screw engaging said nut, a gear train supported by said ejector tube, and a reversible electric motor driving said gear train, said jack screw having a splined end slidably engaging said gear train, guide means joined within said ejector tube for axially guiding said actuator tube, means for disengaging said jack screw from said gear train to permit said device to exert a counterbalancing force on said first element, said counterbalancing force being produced by the gaseous charge within said device acting against said actuator tube and tending to move said actuator tube from said ejector tube, a latch plug slidable within said base member for retaining and releasing said holding means, a compression spring biasing said latch plug in the retaining position, and a ballistic initiator, said ballistic initiator upon detonation moving said latch plug to the position releasing said holding means to release said ejector tube and said actuator tube from said housing member for ejection from said housing member by the energy of said gaseous charge and high pressure products of combustion from said ballistic initiator acting against said ejector tube and said actuator tube.

12. A device, charged with high pressure air or other gaseous medium, for counterbalancing and moving a first element in relation to a second element, said device comprising a housing member, a cylinder within said housing member, a transverse ring integral with said housing member and extending into said cylinder, said ring having a cam surface transverse to the axis of said cylinder, a base member joined to said housing member and adapted for joining to said second element, an ejector tube forming a piston within said cylinder, a retainer ring, said retainer ring being joined to said ejector tube and having a plurality of axially extending fingers for releasable engagement with the cam surface on said transverse ring, holding means for releasably forcing the fingers of said retaining ring against the cam surface on said transverse ring, an actuator tube forming a piston within and coaxial with said ejector tube, an end plug joined to the outside end of said actuator tube and adapted for joining to said first element, a guide disk, said guide disk being axially slidable within said ejector tube and joined to the inner end of said actuator tube, drive means within said ejector tube for axially extending and retracting said actuator tube to actuate said first element in relation to said second element, said drive means comprising a nut joined to said guide disk, a jack screw engaging said nut, a gear train supported by said ejector tube, and a reversible electric motor driving said gear train, said jack screw having a splined end slidably engaging said gear train, guide means joined within said ejector tube for axially guiding said actuator tube by engaging said guide disk, said guide disk having slots for engaging said guide means, means for disengaging said jack screw from said gear train to permit said device to exert a counterbalancing force on said first element, said counterbalancing force being produced by the gaseous charge within said device acting against said actuator tube and tending to move said actuator tube from said ejector tube, a latch plug slidable within said base member for retaining and releasing said holding means, a compression spring biasing said latch plug in the retaining position, and a ballistic initiator, said ballistic initiator upon detonation moving said latch plug to the position releasing said holding means to release said ejector tube and said actuator tube from said housing member for ejection from said housing member by the energy of said gaseous charge and high pressure products of combustion from said ballistic initiator acting against said ejector tube and said actuator tube.

References Cited in the file of this patent
UNITED STATES PATENTS

| | | |
|---|---|---|
| 2,476,376 | Laraque | July 19, 1949 |
| 2,479,713 | Beach | Aug. 23, 1949 |
| 2,660,028 | Geyer | Nov. 24, 1953 |
| 2,924,403 | Mohrlock | Feb. 9, 1960 |
| 2,924,404 | McAnally | Feb. 9, 1960 |